No. 837,740. PATENTED DEC. 4, 1906.
S. SEITNER, Jr.
ATTACHMENT FOR CULTIVATORS.
APPLICATION FILED JUNE 7, 1906.

WITNESSES:
N. Allemong.
Helen B. McCord.

INVENTOR.
Samuel Seitner Jr.
BY
V. H. Lockwood
ATTORNEY.

UNITED STATES PATENT OFFICE.

SAMUEL SEITNER, JR., OF ROANN, INDIANA.

ATTACHMENT FOR CULTIVATORS.

No. 837,740.   Specification of Letters Patent.   Patented Dec. 4, 1906.

Application filed June 7, 1906. Serial No. 320,534.

*To all whom it may concern:*

Be it known that I, SAMUEL SEITNER, Jr., of Roann, county of Wabash, and State of Indiana, have invented a certain new and useful Attachment for Cultivators; and I do hereby declare that the following is a full, clear, and exact description thereof, reference being had to the accompanying drawings, in which like figures refer to like parts.

The object of this invention is to provide a convenient and effective means in or adapted to be attached to cultivators for regulating the depth of the shovels during use. Said mechanism, as shown herein, is an attachment to a common type of cultivator, and it may be attached to a cultivator already built or in use or it may be built at the same time as the rest of the cultivator.

The full nature of this invention will be more fully understood from the accompanying drawings and the following description and claims.

Figure 1:
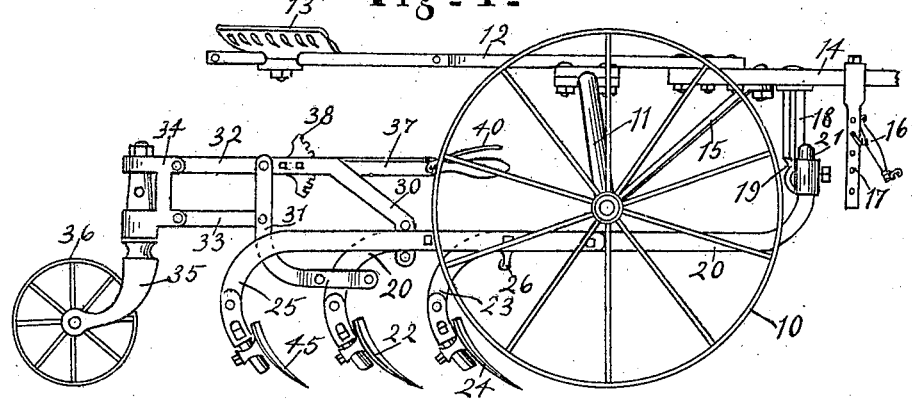
Figure 2:
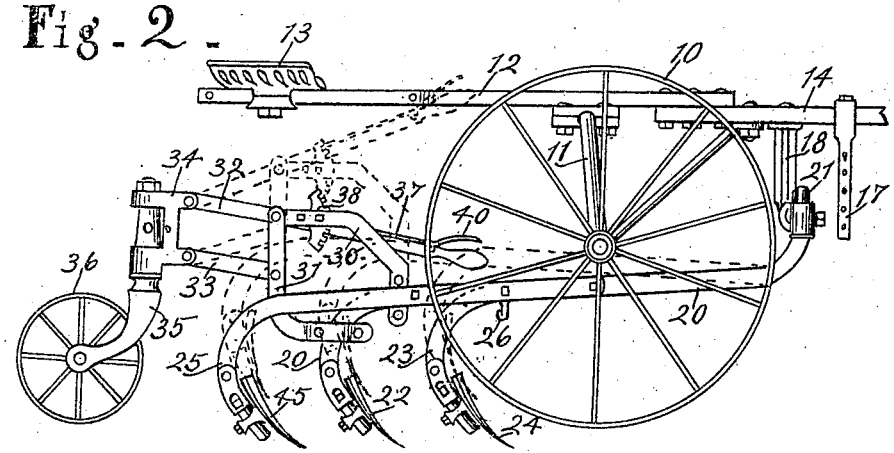
Figure 3:
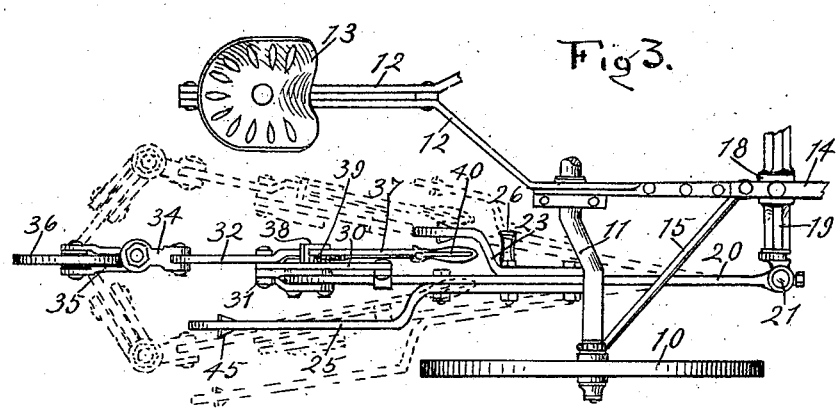

In the drawings, Figure 1 is a side elevation of a cultivator with said invention in connection therewith, the tongue of the cultivator being broken away and the parts in their normal position. Fig. 2 is the same with the shovels depressed and their elevated position shown by dotted lines. Fig. 3 is a plan view of the right-hand half of the cultivator shown in Figs. 1 and 2, lateral positions of the gang being shown by dotted lines.

The drawings herein show in detail a wheel 10 and an axle 11, cranked substantially as shown, that carries a frame 12 upon it, to the rear end of which a seat 13 is secured and to the forward end of which a tongue 14 is secured. A brace 15 extends from the axle to the tongue. 16 is a swingletree connected with vertical bars 17, fastened on the tongue. An arm 18 extends downwardly from the tongue and carries a transverse bar 19, to which a gang-beam 20 is fulcrumed at 21. Said beam 20 carries the shovel 22, and to the sides of said beam auxiliary beams 23 and 25 are bolted, the former carrying a shovel 24 and the latter a shovel 45.

The foregoing constitutes an ordinary type of cultivator in which the gang of shovels rides upon the ground by gravity. The gang is moved laterally by the foot of the operator engaging the foot-rest 26.

My invention consists in adding to the foregoing the following mechanism: A frame consisting of the bars 30 and 31 is secured rigidly to the gang. In the drawings herein said bars are clamped to the middle beam 20, so as to be rigid. To the rear vertical portion of the frame, as herein shown to the bar 31, I pivot two parallel bars 32 and 33, one above the other and of equal length, so that the ends of said bars may move vertically. To the outer end of said bars I pivot the caster-bracket 34, and in that bracket a caster-shaft 35 is swiveled in a vertical position, and a swivel-wheel 36 is carried at the lower end of said caster-shaft, the lower end of said caster-shaft being curved or bent, as shown.

To the bar 32 I secure a hand-lever 37, said lever in the drawings being shown integral with said bar 32 and extending within reach of the operator. It oscillates vertically in a segmental guide 38, which has notches or teeth adapted to be engaged by a bar 39 on the end of the bar-lever 40, whereby said lever 37 is locked in any desired position.

The shovels are depressed and made to run deeper in the soil by depressing the handle 37, as shown in Fig. 2. They are elevated by the elevation of said hand-lever, as shown by dotted lines in Fig. 2, and they may be set at any intermediate position desired, so as to cause said shovels to run at the desired depth in the soil. The swivel-wheel 36 in no wise interferes with the lateral shifting of the gang by the operator's foot, as shown in Fig. 3.

What I claim as my invention, and desire to secure by Letters Patent, is—

1. In a cultivator, the combination of a gang-beam, a vertically-disposed frame secured thereto, a pair of horizontally-disposed parallel bars pivoted to the said frame and extending rearward, a swiveled ground-wheel pivotally connected to the rear ends of said bars, a hand-lever rigidly connected with one of said bars for vertically adjusting said gang-beam, and means for locking said hand-lever on said frame for holding the gang in the desired position, substantially as set forth.

2. In a cultivator, the combination of a gang-beam fulcrumed toward its front end, a frame extending upward from the rear end thereof, a horizontally-disposed lever fulcrumed between its ends to said frame, a ground-wheel to the rear of the gang-beam, a caster-bracket in which said wheel is swiveled and which is pivotally connected with the rear end of said lever, and a connecting-bar parallel with the rear end of said lever that is pivotally connected at its two ends with said frame and caster-bracket respectively, substantially as set forth.

In witness whereof I have hereunto affixed my signature in the presence of the witnesses herein named.

SAMUEL SEITNER, JR.

Witnesses:
CHAS. H. BROWER,
C. H. LA SELLE.